UNITED STATES PATENT OFFICE.

ANTON WEINDEL, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

PROCESS FOR PRODUCING CONDENSATION PRODUCTS FROM PHENOLS WITH FORMIC ALDEHYDE.

1,039,858.  Specification of Letters Patent.  Patented Oct. 1, 1912.

No Drawing.   Application filed January 21, 1911. Serial No. 603,907.

*To all whom it may concern:*

Be it known that I, ANTON WEINDEL, doctor of philosophy, chemist, citizen of the German Empire, residing at Leverkusen, near Cologne, Germany, have invented new and useful Improvements in Processes for Producing Condensation Products from Phenols with Formic Aldehyde, of which the following is a specification.

In the process of condensing phenols and formaldehyde, salts, acids, alkalis and other agents of condensation have been recommended, but all of the chemicals hitherto employed show the disadvantage that they tenaceously adhere to the mass of reaction and thus injuriously affect the solubility and color of the final product. It has now been found that mono- and dichlorhydrin, when used as agent of condensation, are free from this drawback and that by the use of these chemicals the reaction not only proceeds smoothly and quietly, but that also a product is obtained which is clear and transparent. This is due to the fact that mono-and dichlorhydrin can be easily removed from the mass of reaction by washing with warm water, or steam or by heating at ordinary pressure or at reduced pressure. But the mass of reaction is not even injuriously affected, if without such a purification, the agents of condensation remain in admixture with the final product.

In order to carry out my process practically I may proceed as follows, the parts given being by weight.

Example 1: 100 parts of phenol and 100 parts of an aqueous solution of formaldehyde containing 40 percent formaldehyde and 10 parts of monochlorhydrin of the alpha modification are boiled until the separation of an oil is observed. The product of condensation thus obtained is then purified with warm water or steam or by heating at ordinary or reduced pressure. Thus an oil is obtained which, when heated to 140–150° C. furnishes a transparent resinous mass which is soluble in alcohol and acetone, but insoluble in water and acids.

Example 2: 100 parts of phenol and 100 parts of an aqueous solution of formaldehyde containing 40 per cent. formaldehyde and 10 parts of mono- or dichlorhydrin are boiled during some hours until the separation of the oil is practically completed. A thick liquid is obtained solidifying in the cold. It is insoluble in the usual organic solvents.

Instead of phenol, homologues of phenols and analogous substances such as for example oxybenzaldehyde may be used. Instead of formaldehyde, paraform or similar aldehyde substances such as methylacetaldehyde, benzaldehyde, etc., may be employed.

I claim:—

1. Process for the production of phenol-aldehyde condensation products which comprises intermixing a chlorhydrin with the aldehyde and phenol, and heating the resulting mixture until separation of the condensation products takes place.

2. Process for the production of phenol-aldehyde condensation products which comprises intermixing a monochlorhydrin with the aldehyde and phenol, and heating the resulting mixture until separation of the condensation product takes place.

3. Process for the production of condensation products of phenol and formaldehyde which comprises intermixing a chlorhydrin with the phenol and formaldehyde, and heating the resulting mixture until separation of the condensation product takes place.

4. Process for the production of condensation products of phenol and formaldehyde which comprises intermixing a mono-chlorhydrin with the phenol and formaldehyde, and heating the resulting mixture until separation of the condensation product takes place.

In testimony whereof I have hereunto set my hand in the presence of two subscribing witnesses.

ANTON WEINDEL. [L. S.]

Witnesses:
WALTER VONNEGUT,
ALFRED HENKEL.